(12) United States Patent
Hatano et al.

(10) Patent No.: US 9,350,889 B2
(45) Date of Patent: May 24, 2016

(54) IMAGE FORMING APPARATUS CAPABLE OF REDUCING POWER CONSUMPTION, CONTROL METHOD THEREFOR, AND STORAGE MEDIUM

(71) Applicant: CANON KABUSHIKI KAISHA, Tokyo (JP)

(72) Inventors: Manami Hatano, Yokohama (JP); Daisuke Ito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/552,801

(22) Filed: Nov. 25, 2014

(65) Prior Publication Data
US 2015/0146252 A1 May 28, 2015

(30) Foreign Application Priority Data
Nov. 26, 2013 (JP) .................. 2013-243753

(51) Int. Cl.
*H04N 1/00* (2006.01)
*G06F 1/32* (2006.01)

(52) U.S. Cl.
CPC .......... *H04N 1/00904* (2013.01); *G06F 1/3234* (2013.01); *G06F 1/3284* (2013.01); *H04N 1/00244* (2013.01); *H04N 1/00408* (2013.01); *H04N 1/00464* (2013.01); *H04N 1/00503* (2013.01); *H04N 2201/0094* (2013.01)

(58) Field of Classification Search
CPC ................................... H04N 1/00904
USPC ...................... 358/1.13, 1.14, 1.15
See application file for complete search history.

(56) References Cited

U.S. PATENT DOCUMENTS

| 2006/0238794 | A1* | 10/2006 | Hada | ............................ 358/1.13 |
| 2007/0182998 | A1* | 8/2007 | Okada | ........................... 358/400 |
| 2009/0198811 | A1* | 8/2009 | Yasui | .................. H04L 41/0213 709/223 |
| 2011/0128572 | A1* | 6/2011 | Hosotsubo | .............. G06F 3/122 358/1.15 |

FOREIGN PATENT DOCUMENTS

JP 2001285543 A 10/2001

* cited by examiner

*Primary Examiner* — Jacky X Zheng
(74) *Attorney, Agent, or Firm* — Rossi, Kimms & McDowell LLP

(57) ABSTRACT

An image forming apparatus that uses a Web application and is capable of performing image processing without delay and reducing power consumption. The image forming apparatus communicates with a Web server. A scanner unit reads an image, and a printing unit prints the image. Power is supplied to at least one of the scanner unit and the printing unit. A user interface unit displays an operating screen based on data transmitted from the Web server, and based on the data, power is supplied selectively to the scanner unit or the printing unit.

7 Claims, 16 Drawing Sheets

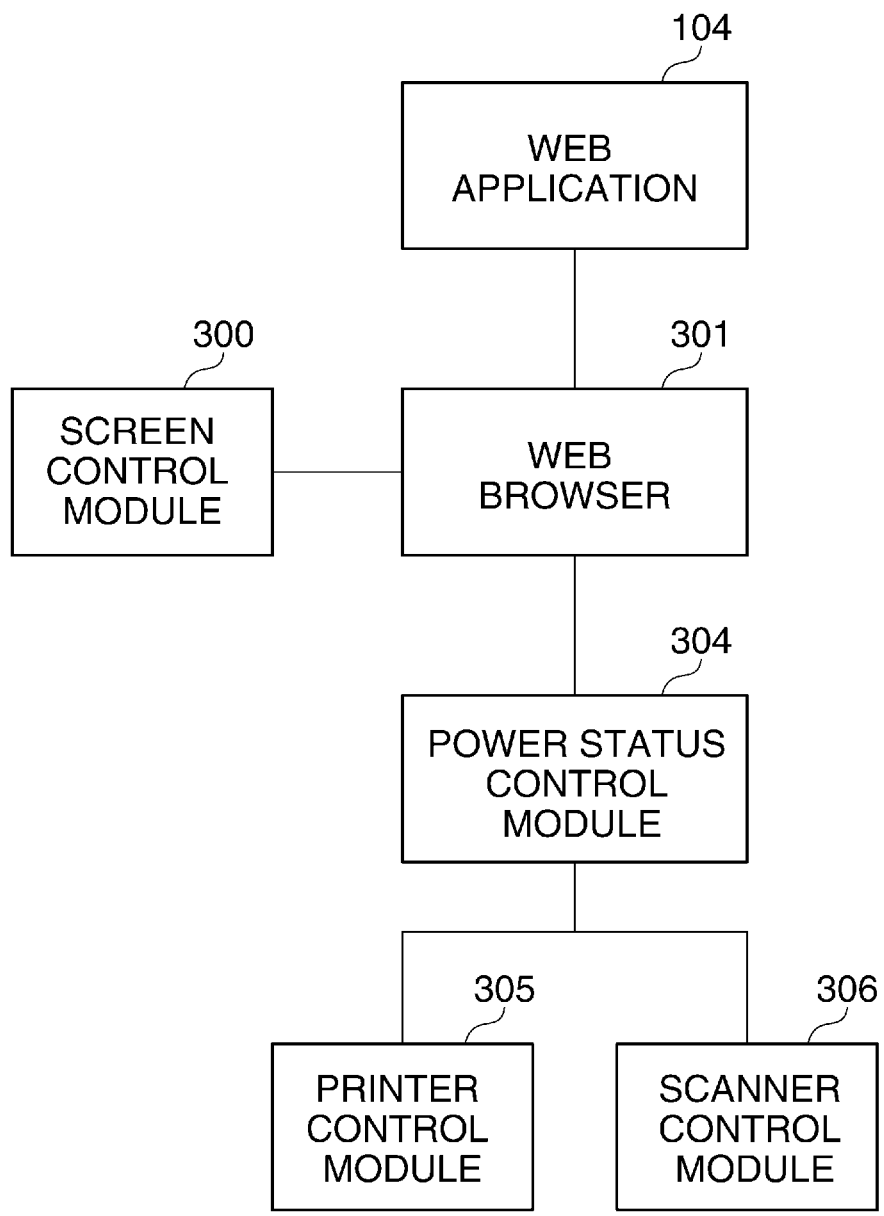

FIG. 9A

| ApplicationID | Application name | URL | UNIT-TO-BE-USED INFORMATION |
|---|---|---|---|
| A | WEB APP | http://www.a.com | scanner |
| B | XXXX | http://www.b.com | scanner,printer |
| ⋮ | ⋮ | ⋮ | ⋮ |

```
<!DOCTYPE html>
<html>
<head>
<meta charset="UTF-8">
<title>WEB APP</title>
</head>
<body>
<input type="hidden" name="use_unit" value="scanner, printer">
<p>Web App A User Interface.</p>
•
•
•
</body>
</html>
```

# IMAGE FORMING APPARATUS CAPABLE OF REDUCING POWER CONSUMPTION, CONTROL METHOD THEREFOR, AND STORAGE MEDIUM

BACKGROUND OF THE INVENTION

1. Field of the Invention

The present invention relates to an image forming apparatus, a control method therefor, and a storage medium.

2. Description of the Related Art

Image forming apparatuses have hardware units such as a scanner and a printer so as to execute jobs such as copying, scanning, and printing in accordance with user's operations.

These hardware units make up a large proportion of power consumed by image forming apparatuses in many cases. For this reason, in actual user operation, power consumption is minimized by halting power supply to unnecessary hardware units as much as possible to save energy.

According to some prior arts, operation records of an application running on an image forming apparatus are analyzed to identify a hardware unit which the application uses, and power is supplied to the identified hardware unit in accordance with the usage timing of the application (see, for example, Japanese Laid-Open Patent Publication (Kokai) No. 2001-285543).

The above prior arts are useful in minimizing power consumption in a case where applications running on an image forming apparatus are fixedly determined, but in cases where applications running on an image forming apparatus are not fixedly determined such as a case where a Web application is used, no consideration is given to, for example, the possibility that an application is not successfully displayed, and hence they are not considered to be adequate for an image forming apparatus from a mechanistic standpoint.

SUMMARY OF THE INVENTION

The present invention provides an image forming apparatus that uses a Web application and is capable of performing perform image processing without delay and reducing power consumption, a control method therefor, and a storage medium.

Accordingly, a first aspect of the present invention provides an image forming apparatus that communicates with a Web server, comprising a reading unit configured to read an image, a printing unit configured to print the image, a power supply unit configured to supply power to at least one of the reading unit and the printing unit, an operating unit configured to display an operating screen based on data transmitted from the Web server, and a control unit configured to, based on the data, provide control as to whether or not to cause the power supply unit to supply power to the reading unit or the printing unit.

Accordingly, a second aspect of the present invention provides a control method for an image forming apparatus that communicates with a Web server and has a reading unit that reads an image and a printing unit that prints the image, comprising a power supply step of supplying power to at least one of the reading unit and the printing unit, an operating step of displaying an operating screen based on data transmitted from the Web server, and a control step of, based on the data, providing control as to whether or not to supply power to the reading unit or the printing unit.

Accordingly, a third aspect of the present invention provides a non-transitory computer-readable storage medium storing a program for causing a computer of an image forming apparatus, which communicates with a Web server and has a reading unit that reads an image and a printing unit that prints the image, to execute a control method for the image forming apparatus, the control method comprising a power supply step of supplying power to at least one of the reading unit and the printing unit, an operating step of displaying an operating screen based on data transmitted from the Web server, and a control step of, based on the data, providing control as to whether or not to supply power to the reading unit or the printing unit.

According to the present invention, when a Web application is to be used, power supply to a hardware unit is controlled based on data sent from the Web server, image processing using the Web application is performed without delay, and power consumption is reduced.

Further features of the present invention will become apparent from the following description of exemplary embodiments (with reference to the attached drawings).

BRIEF DESCRIPTION OF THE DRAWINGS

FIG. 4 is a diagram schematically showing a software arrangement of the image forming apparatus in FIG. 1.

FIG. 9A is a diagram schematically showing a structure of the unit-to-be-used database, and FIG. 9B is a view showing an exemplary HTML description of the Web application.

DESCRIPTION OF THE EMBODIMENTS

The present invention will now be described in detail with reference to the drawings showing an embodiment thereof.

Figure 1:
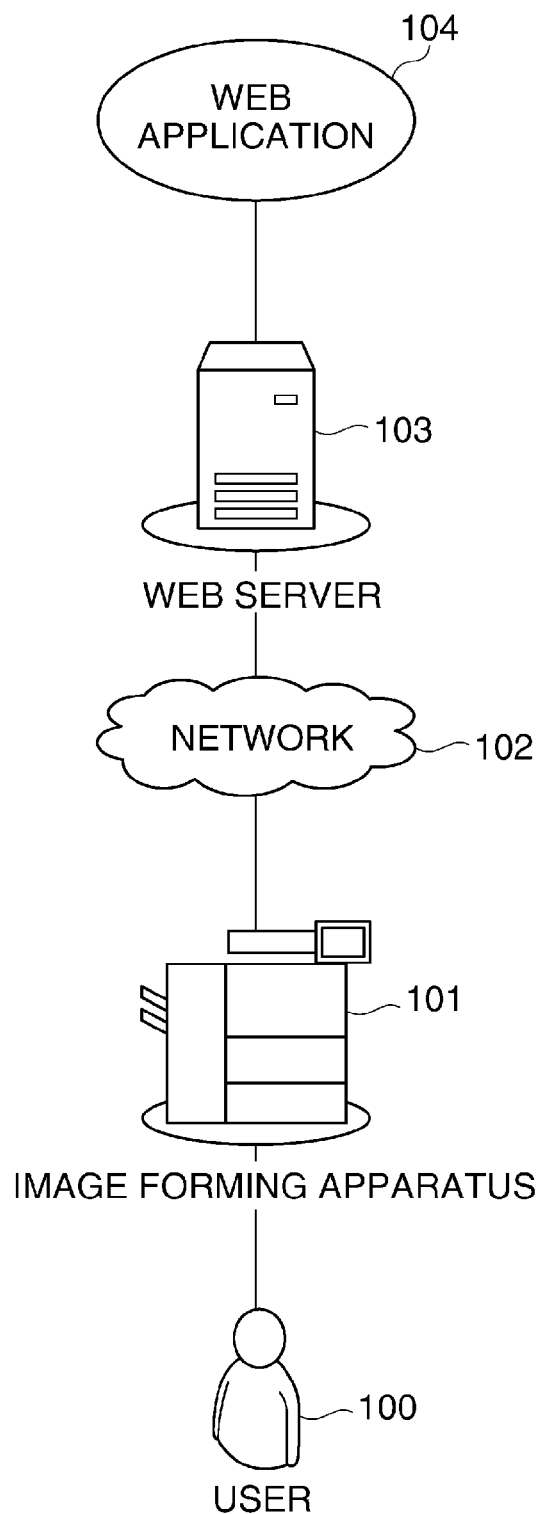
FIG. 1 is a diagram schematically showing an arrangement of an image forming system including an image forming apparatus according to an embodiment of the present invention.

FIG. 1 is a diagram schematically showing an arrangement of an image forming system including an image forming apparatus 101 according to an embodiment of the present invention.

Referring to FIG. 1, the image forming system is comprised of the image forming apparatus 101, a Web server 103, and a network 102 that connects them together.

The image forming apparatus 101 downloads a Web application 104 from the Web server 103, and the Web application 104 running on a Web browser which the image forming apparatus 101 is equipped with. A user 100 uses the Web application 104 by operating the image forming apparatus 101.

Figure 2:
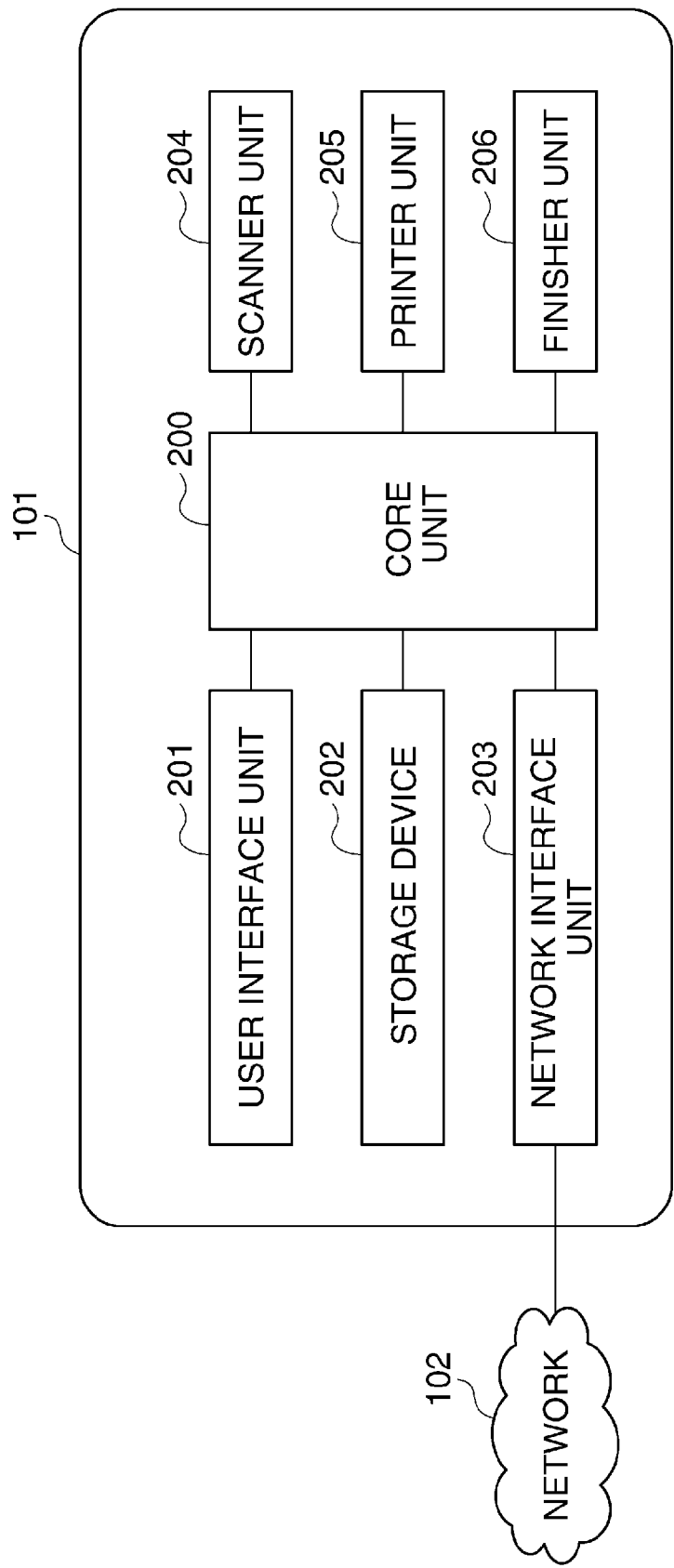
FIG. 2 is a diagram schematically showing an arrangement of the image forming apparatus in FIG. 1.

FIG. 2 is a diagram schematically showing an arrangement of the image forming apparatus 101 in FIG. 1.

Referring to FIG. 2, the image forming apparatus 101 is comprised of a core unit 200, a user interface unit 201, a storage device 202, a network interface unit 203, a scanner unit 204, a printer unit 205, and a finisher unit 206.

The core unit 200 includes, for example, a CPU, not shown, and controls the entire image forming apparatus 101. The user interface unit 201 includes a display unit, not shown, which displays information for the user, and an operating unit, not shown, which is operated by the user.

The storage device 202 is comprised of volatile and nonvolatile storage devices such as RAM, ROM, and HDD, and stores a variety of data and a variety of programs. The network interface unit 203 is an interface to the network 102 such as a NIC.

The scanner unit 204 reads an original to output image data. The printer unit 205 prints image data on a recording medium such as a sheet. The finisher unit 206 carries out post-processing on a recording medium on which image data has been printed by the printer unit 205.

The scanner unit 204, the printer unit 205, and the finisher unit 206 described above are controlled by software, the Web application 104, and so on executed by the core unit 200.

Figure 3:
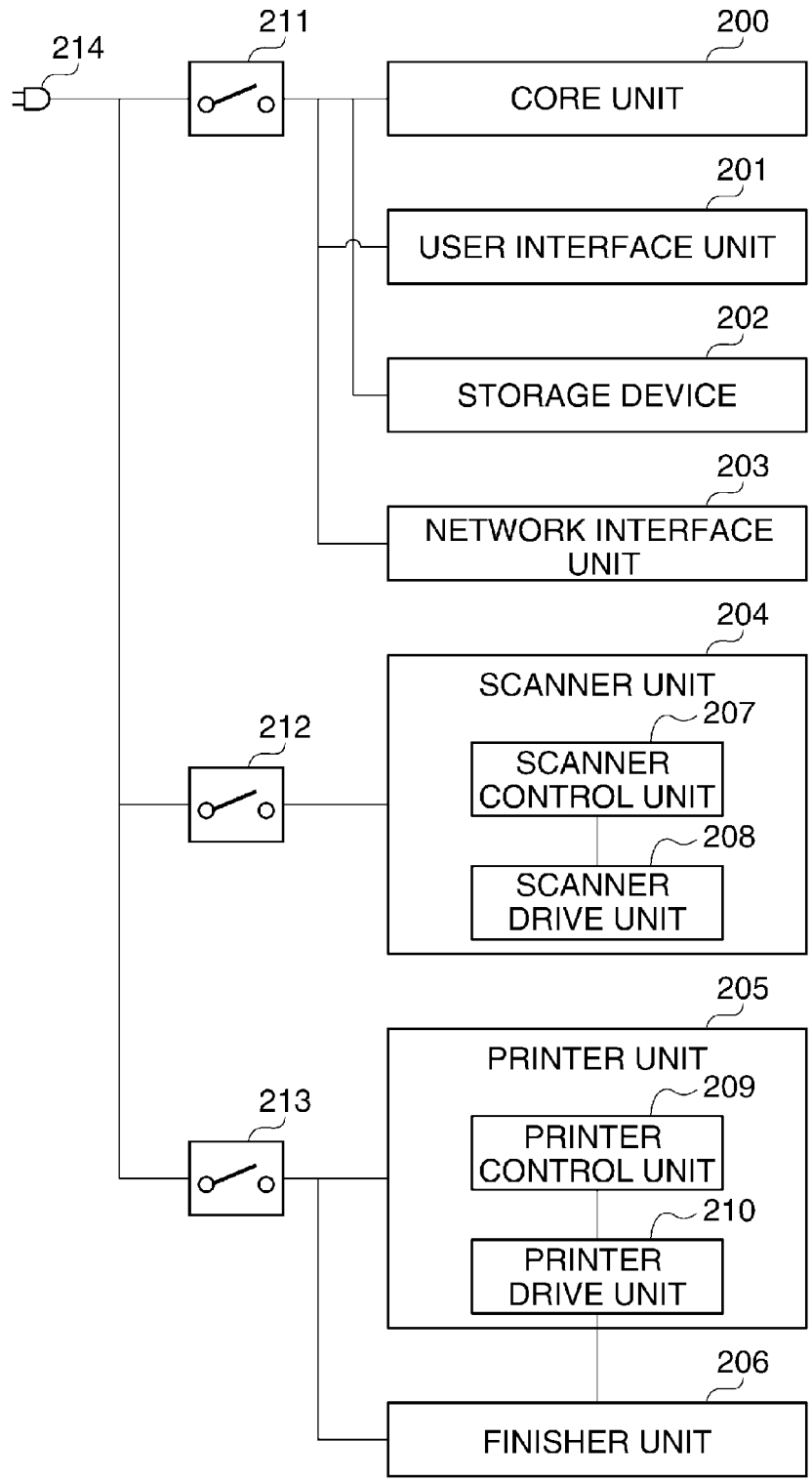
FIG. 3 is a diagram schematically showing a power-supply arrangement of the image forming apparatus in FIG. 1.

FIG. 3 is a diagram schematically showing a power-supply arrangement of the image forming apparatus 101 in FIG. 1.

FIG. 3 shows an outlet 214 and switches 211, 212, and 213 as well as the component elements described with reference to FIG. 2.

The switch 211 turns on or off the power to the core unit 200, the user interface unit 201, the storage device 202, and the network interface unit 203.

The switch 212 turns on or off the power to the scanner unit 204 including a scanner control unit 207 and a scanner drive unit 208. The switch 213 turns on or off the power to the printer unit 205 including a printer control unit 209 and a printer drive unit 210, and the finisher unit 206. Thus, the image forming apparatus 101 according to the present embodiment is able to supply power individually to a plurality of hardware units for use in carrying out image processing.

FIG. 4 is a diagram schematically showing a software arrangement of the image forming apparatus 101 in FIG. 1.

Referring to FIG. 4, software of the image forming apparatus 101 is comprised of the Web application 104, a Web browser 301, a screen control module 300, a power status control module 304, a printer control module 305, and a scanner control module 306.

The screen control module 300 controls screen display on the user interface unit 201, and for example, displays a menu screen 1200 and a screen 1300 of the Web browser 301, which will be described later with reference to FIGS. 5A and 5B. The Web browser 301 obtains the Web application 104. The Web browser 301 also provides the power status control module 304 with notification for controlling the power status of the scanner unit 204 and the printer unit 205.

The power status control module 304 controls the power status of the scanner unit 204 and the printer unit 205 by way of the printer control module 305 and the scanner control module 306.

Specifically, the power status control module 304 sends an instruction that prompts state transition of a hardware unit to which power is to be supplied. This instruction is sent to a hardware unit concerned by way of the printer control module 305 or the scanner control module 306, and power is supplied to the hardware unit so that it can be ready.

Figure 5A:
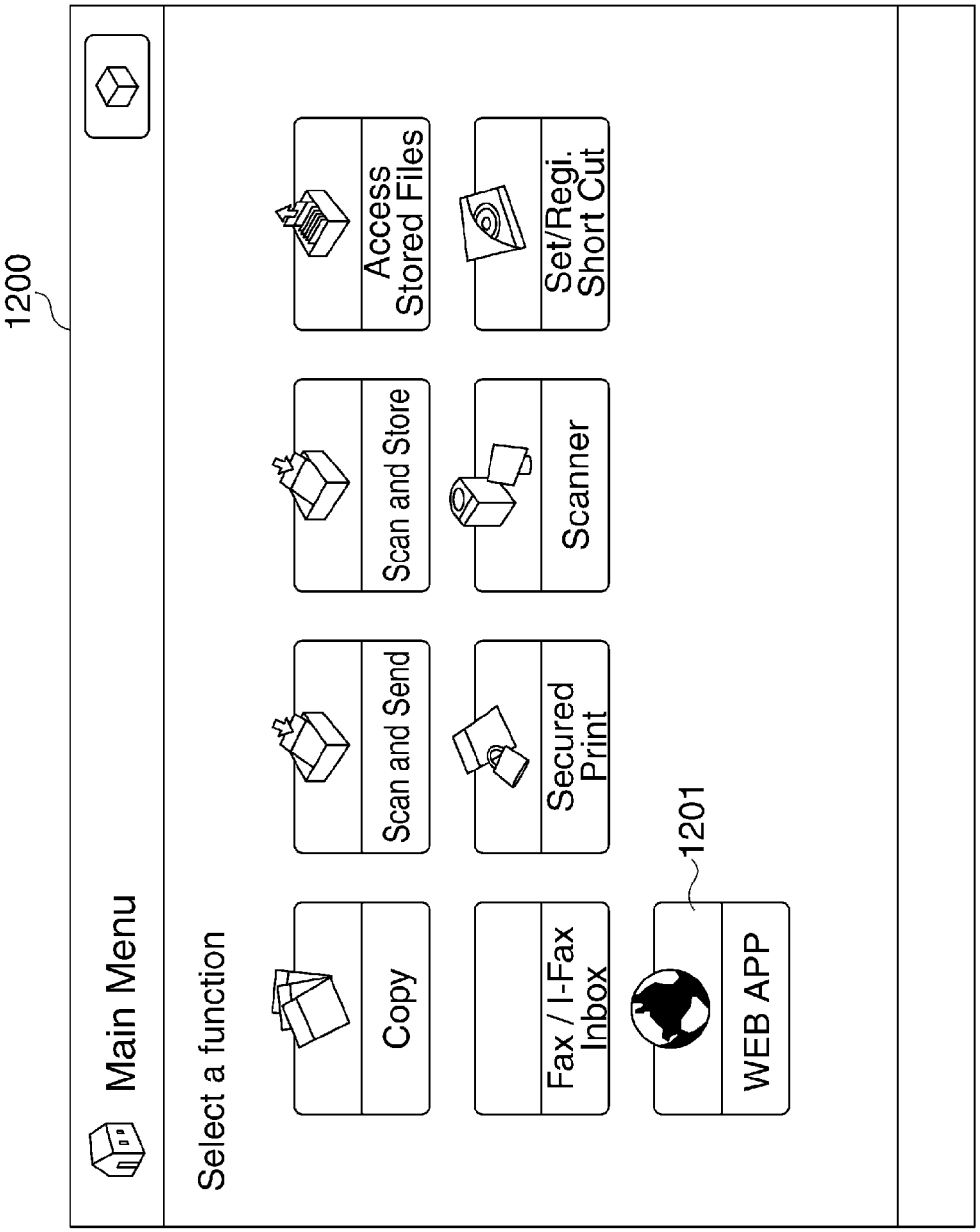
FIGS. 5A and 5B are views showing exemplary screens displayed on a user interface unit in FIG. 2.
Figure 5B:
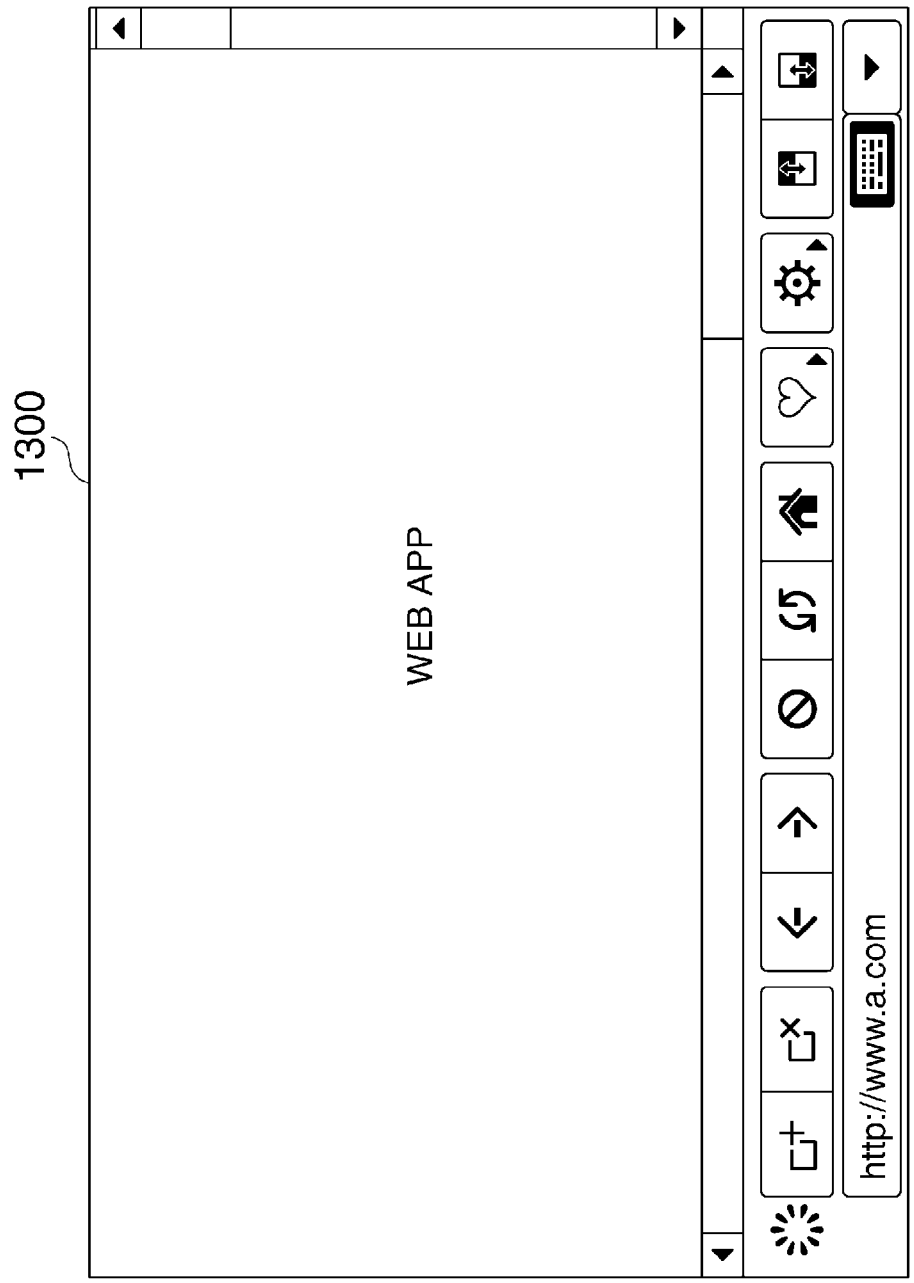

FIGS. 5A and 5B are views showing exemplary screens displayed on the user interface unit 201 in FIG. 2.

FIG. 5A is a view showing the menu screen 1200 for starting copying, printing, and Web application.

Referring to FIG. 5A, when the user depresses a Web app button 1201, a Web application screen is displayed by a Web browser. The user is allowed to add a new shortcut icon to the menu screen 1200.

FIG. 5B is a view showing the screen 1300 on which the Web browser 301 is displayed.

The Web browser 301 executes the Web application 104 by downloading the Web application 104 from the Web server 103. The user 100 is allowed to perform various operations through this screen 1300.

Figure 6:
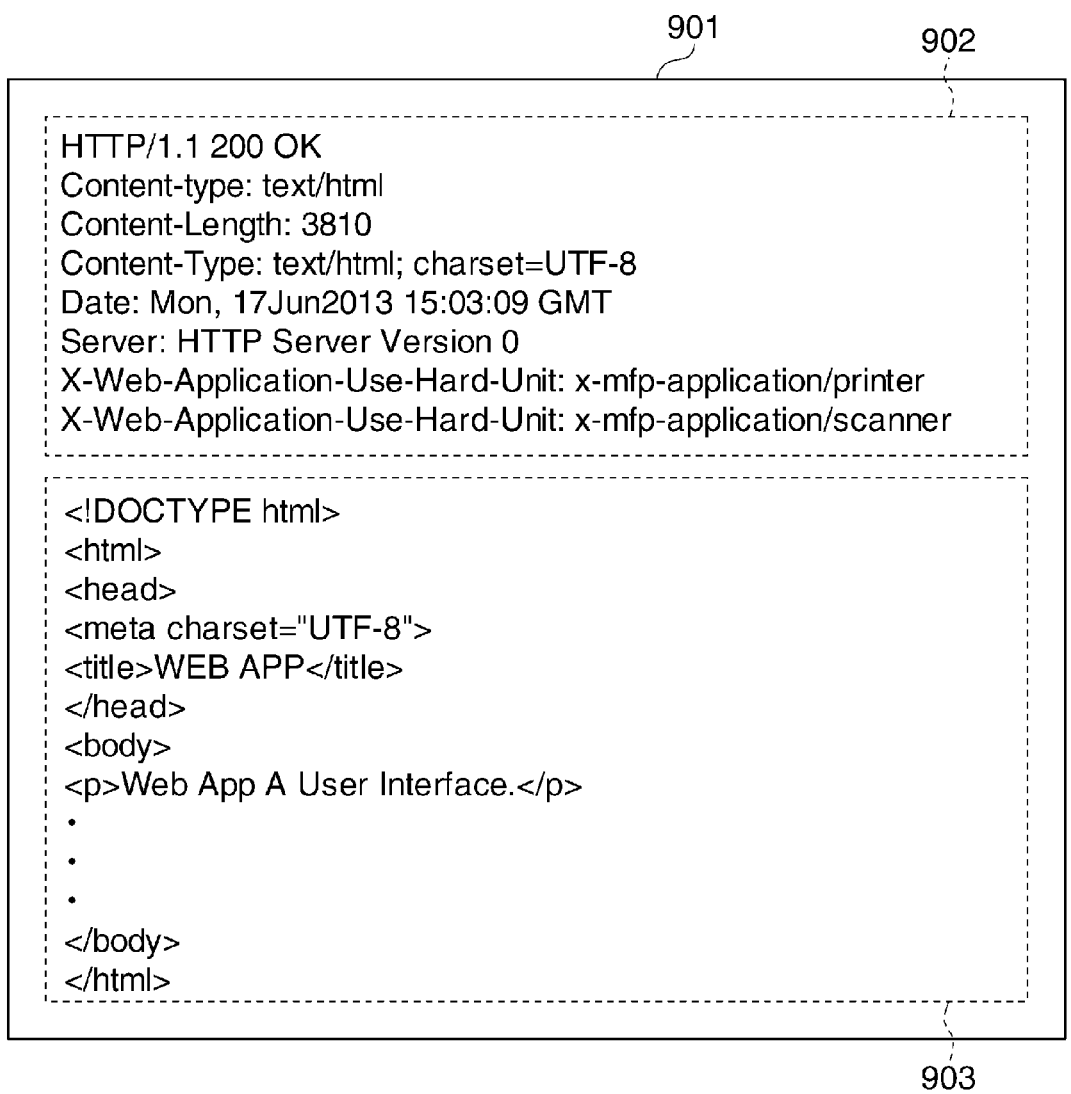
FIG. 6 is a view showing an exemplary HTTP response from a Web application in FIG. 4.

FIG. 6 is a view showing an HTTP response 901 from the Web application 104 in FIG. 4.

Referring to FIG. 6, the HTTP response 901 (specific information) is comprised of a response header 902 and a response body 903.

In the response header 902, a plurality of header elements in which "header names" and "header values" are separated by colons is listed. The header elements include those for which description methods and meanings are determined according to protocols such as HTTP and those which are allowed to be freely described as the need arises. For the latter header elements, header names are required to begin with "x-".

The response body 903 includes HTML in which a display part of the Web application 104 subjected to rendering by the web browser 301 is described.

The HTTP response 901 includes header elements that represent hardware units to be used. In the example shown in FIG. 6, a header name is "X-Web-Application-Use-Hard-Unit", and one of header values is "x-mfp-application/printer". In this case, the header values include a hardware unit name "printer", and this means that the Web application 104 uses the printer unit 205.

The other one of the header values is "x-mfp-application/scanner". In this case, the header values include a hardware unit name "scanner", and this means that the Web application 104 uses the scanner unit 204.

It should be noted that hardware units to be used should not necessarily be described in the format represented by the HTTP response 901 in FIG. 6 as long as they are clearly specified as shown in the HTTP response 901. Moreover, something which indicates hardware units to be used may be described in any part other than the response header 902 of the HTTP response 901.

Figure 7:
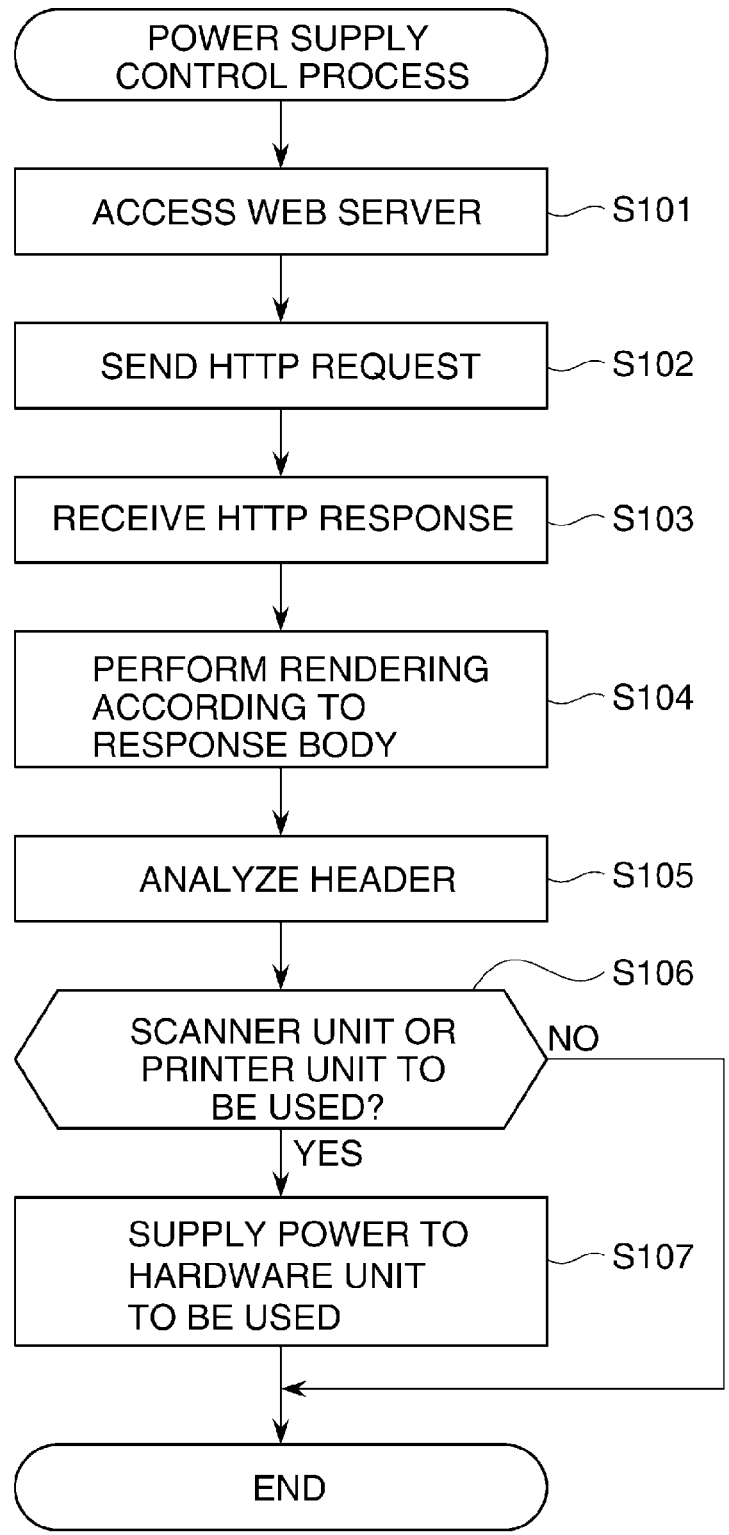
FIG. 7 is a flowchart showing the procedure of a power supply control process that is carried out by a core unit in FIG. 2.

FIG. 7 is a flowchart showing the procedure of a power supply control process that is carried out by the core unit 200 in FIG. 2.

The process in FIG. 7 is started by the core unit 200 of the image forming apparatus 101 accessing the Web server 103 when the Web application 104 is to be displayed based on an instruction from the user 100.

First, the core unit 200 accesses the Web server 103 using the Web browser 301 (step S101) and sends an HTTP request to the Web server 103 (step S102). Upon receiving the HTTP response 901 from the Web server 103 (step S103), the core unit 200 renders the response body 903 of the received HTTP response 901 for the screen control module 300 (step S104). When the response body 903 is rendered, the core unit 200 analyzes the response header 902 of the received HTTP response 901 using the power status control module 304 (step S105).

Then, based on a result of the analysis in the step S105, the core unit 200 determines whether or not information on the scanner unit 204 or the printer unit 205 is described in the response header 902, that is, whether or not the Web application 104 uses the scanner unit 204 or the printer unit 205 (step S106). When it is determined in the step S106 that the Web application 104 does not use the scanner unit 204 or the printer unit 205 (NO in the step S106), the core unit 200 terminates the present process.

On the other hand, upon determining in the step S106 that the Web application 104 uses the scanner unit 204 or the printer unit 205 (YES in the step S106), the core unit 200 supplies power to a hardware unit to be used (the scanner unit 204 or the printer unit 205) using the power status control module 304 (step S107) and terminates the present process.

Although in the embodiment described above, a hardware unit to be used is determined using the HTTP response 901, a hardware unit to be used may be determined using a unit-to-be-used database in which hardware units to be used are registered in advance. Referring next to FIGS. 8 to 12B, a description will be given of the case where the unit-to-be-used database is used.

Figure 8:
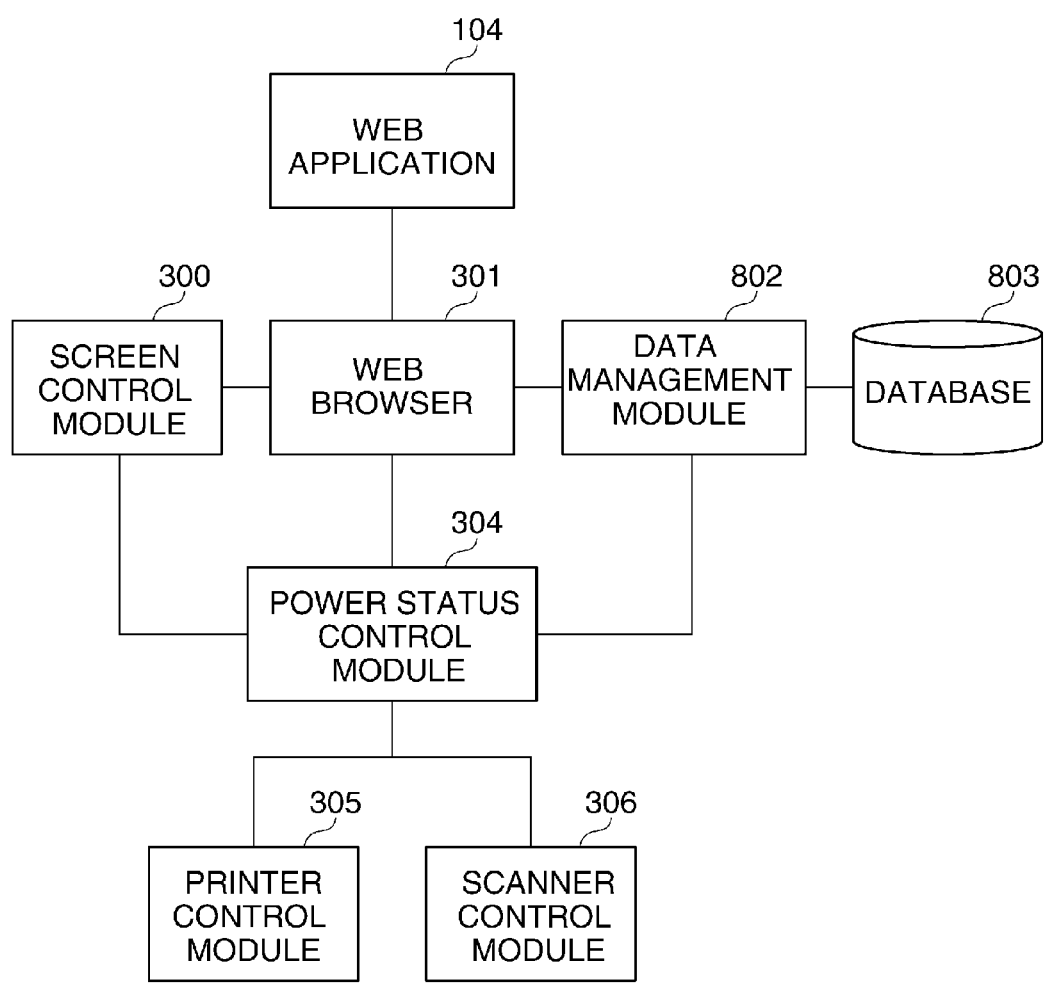
FIG. 8 is a diagram schematically showing a software arrangement of the image forming apparatus in a case where a unit-to-be-used database is used.

FIG. 8 is a diagram schematically showing a software arrangement of the image forming apparatus 101 in the case where the unit-to-be-used database 803 is used.

Referring to FIG. 8, the image forming apparatus 101 has a software arrangement in which the unit-to-be-used database 803 and a data management module 802, which manages the unit-to-be-used database 803, are added to the software arrangement shown in FIG. 4. The Web browser 301 registers information related to the Web application 104 in the unit-to-be-used database 803 using the data management module 802.

Further, the power status control module 304 works in conjunction with the screen control module 300 to obtain information on events occurring in relation to screens and refers to the information registered in the unit-to-be-used database 803 using the data management module 802.

FIG. 9A is a diagram schematically showing a structure of the unit-to-be-used database 803, and FIG. 9B is a view showing an exemplary HTML description of the Web application 104.

Referring to FIG. 9A, an application ID 400 is identification information for identifying Web applications. URL 402 is URLs of Web applications. Unit-to-be-used information 403 indicates hardware units to be used by Web applications.

Referring to FIG. 9B, the scanner unit 204 and the printer unit 205 are listed as hardware units to be used. Hardware units to be used should not always be described in HTML as shown in FIG. 9B, but may be described in an external file like a Java (registered trademark) script that associates data to specific elements.

Figure 10:
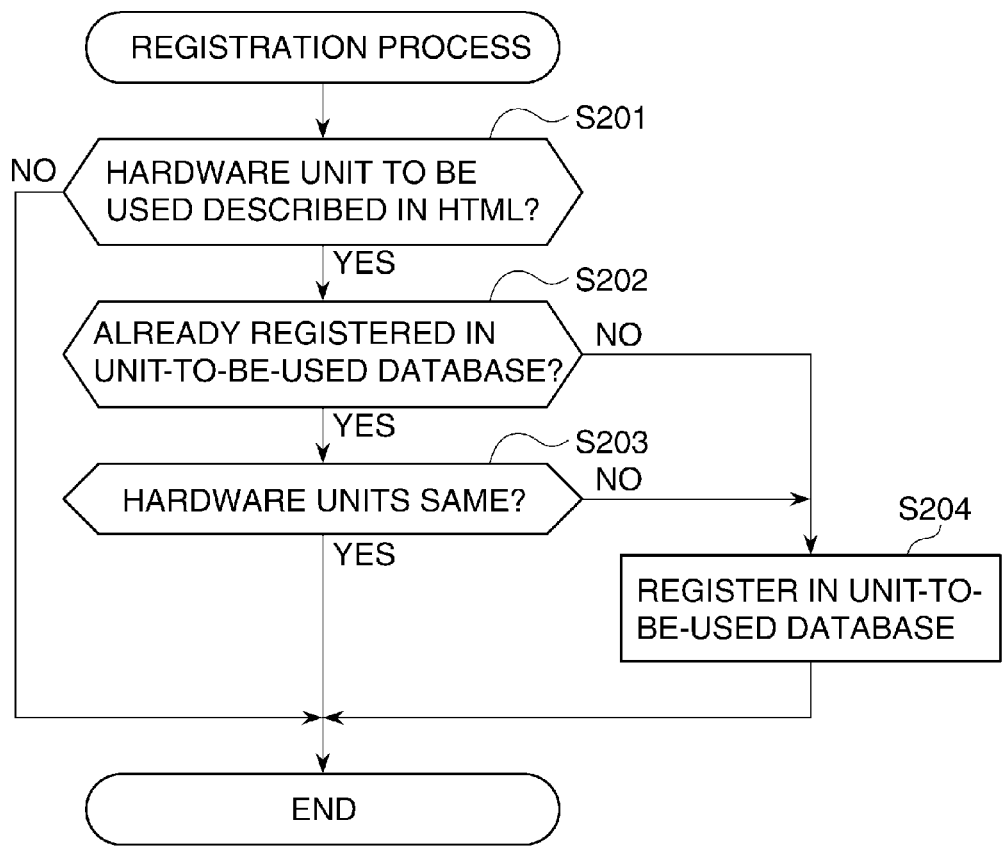
FIG. 10 is a flowchart showing the procedure of a registration process for the unit-to-be-used database, which is carried out by the core unit in FIG. 2.

FIG. 10 is a flowchart showing the procedure of a registration process for the unit-to-be-used database 803, which is carried out by the core unit 200 in FIG. 2.

The registration process in FIG. 10 is started by the Web browser 301 starting rendering HTML of the Web application 104 for the screen control module 300.

Referring to FIG. 10, the core unit 200 determines whether or not a hardware unit to be used is described in HTML of the Web application 104 (step S201). As a result of the determination in the step S201, when the hardware unit to be used is described in HTML of the Web application 104 (NO in the step S201), the core unit 200 terminates the present process.

On the other hand, as a result of the determination in the step S201, when the hardware unit to be used is described in HTML of the Web application 104 (YES in the step S201), the core unit 200 obtains the unit-to-be-used information 403 from the unit-to-be-used database 803 using the data management module 802, and based on the obtained unit-to-be-used information 403, determines whether or not the hardware unit to be used by the Web application 104 has already been registered in the unit-to-be-used database 803 (step S202).

As a result of the determination in the step S202, when the hardware unit to be used by the Web application 104 has not yet been registered in the unit-to-be-used database 803 (NO in the step S202), the core unit 200 registers the hardware unit to be used by the Web application 104 in the unit-to-be-used database 803 based on the information described in HTML (step S204) and terminates the present process.

On the other hand, as a result of the determination in the step S202, when the hardware unit to be used by the Web application 104 has already been registered in the unit-to-be-used database 803 (YES in the step S202), the core unit 200 determines whether or not the hardware unit described in HTML is the same as a hardware unit indicated in the unit-to-be-used information 403 (step S203).

As a result of the determination in the step S203, when the hardware unit described in HTML is the same as a hardware unit indicated in the unit-to-be-used information 403 (YES in the step S203), the core unit 200 terminates the present process.

On the other hand, as a result of the determination in the step S203, when the hardware unit described in HTML is not the same as a hardware unit indicated in the unit-to-be-used information 403 (NO in the step S203), the core unit 200 registers the hardware unit described in HTML as a hardware unit to be used by the Web application 104 to update the unit-to-be-used information 403 in the unit-to-be-used database 803 (step S204) and terminates the present process.

Figure 11:
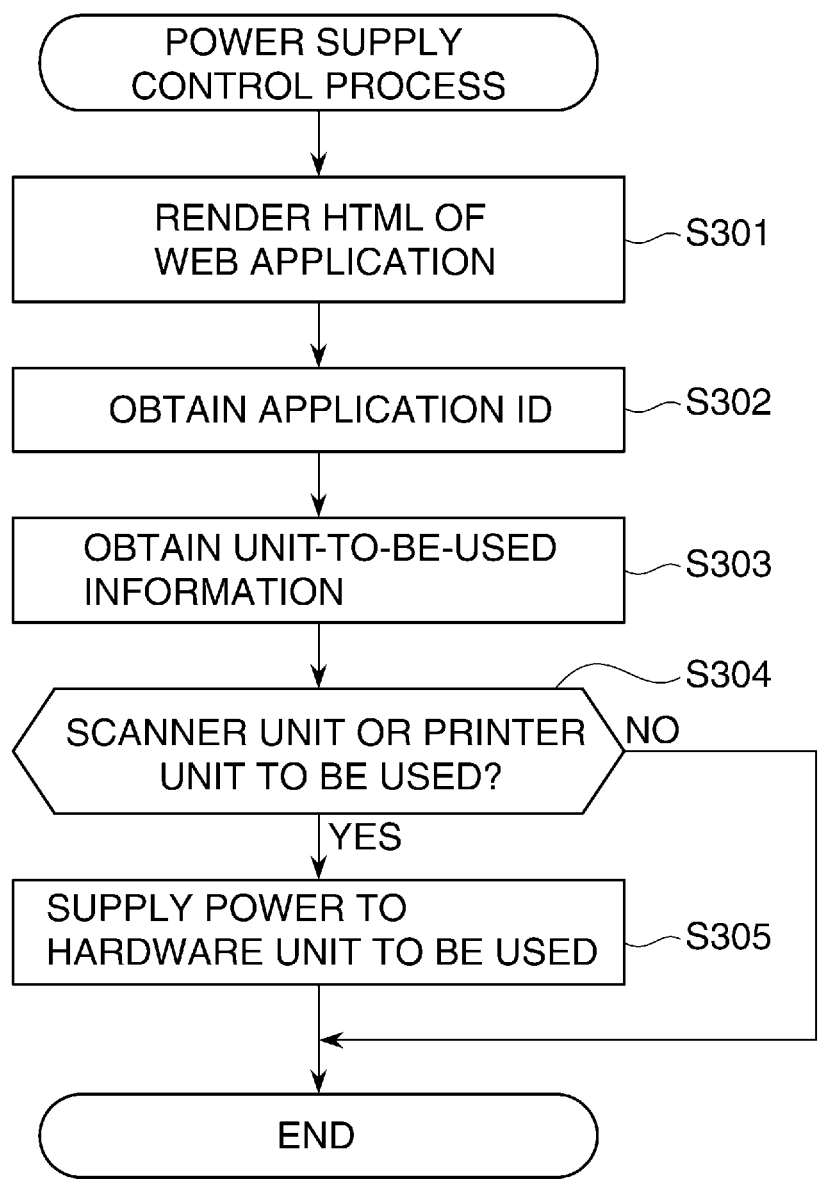
FIG. 11 is a flowchart showing the procedure of a power supply control process that is carried out by the core unit in FIG. 2 in a case where the unit-to-be-used database is used.

FIG. 11 is a flowchart showing the procedure of a power supply control process in a case where the unit-to-be-used database 803 is used.

The process in FIG. 11 is carried out by the core unit 200 in FIG. 2 when the user depresses the Web app button 1201 in FIG. 3.

First, the core unit 200 renders HTML of the Web application 104 for the screen control module 300 using the Web browser 301 (step S301). Next, the core unit 200 obtains the application ID 400 of the Web application 104 (step S302).

Then, the core unit 200 obtains the unit-to-be-used information 403 corresponding to the application ID 400 of the Web application 104 from the unit-to-be-used database 803 using the data management module 802 (step S303). Based on the obtained unit-to-be-used information 403, the core unit 200 determines whether or not the Web application 104 uses the scanner unit 204 or the printer unit 205 (step S304).

As a result of the determination in the step S304, when the Web application 104 does not use the scanner unit 204 or the printer unit 205 (NO in the step S304), the core unit 200 terminates the present process. On the other hand, when it is determined in the step S304 that the Web application 104 uses the scanner unit 204 or the printer unit 205 (YES in the step S304), the core unit 200 supplies power to the scanner unit 204 or the printer unit 205, which is a hardware unit to be used, using the power status control module 304 (step S305) and terminates the present process.

Although in FIG. 11, the power supply control process is carried out using the unit-to-be-used database 803, the power supply control process may be carried out using the HTTP response 901, in which a hardware unit to be used is described, in conjunction with the unit-to-be-used database 803.

Figure 12A:
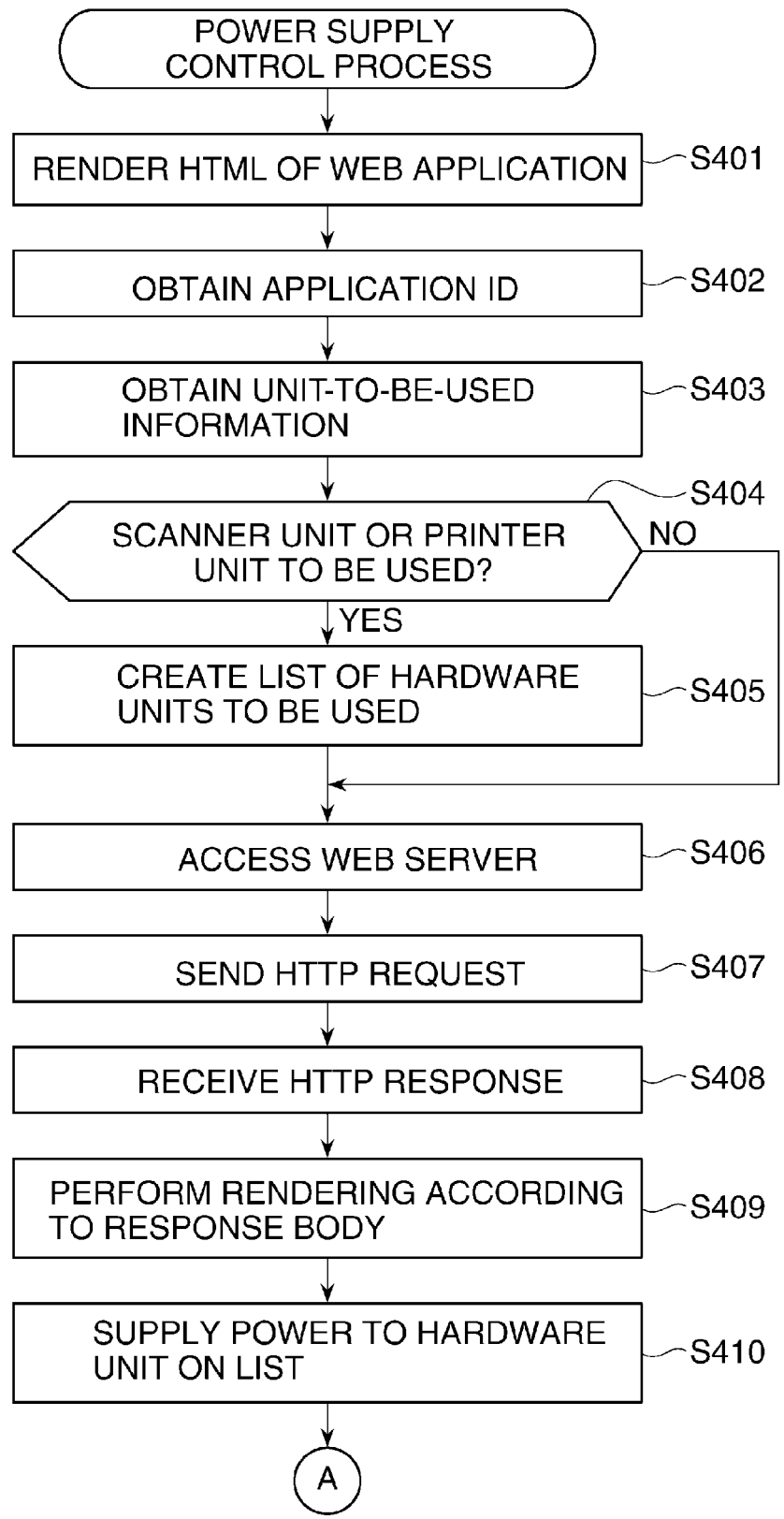
FIGS. 12A and 12B are flowcharts showing the procedure of a power supply control process that is carried out by the core unit in FIG. 2 in a case where the unit-to-be-used database and an HTTP response are used.
Figure 12B:
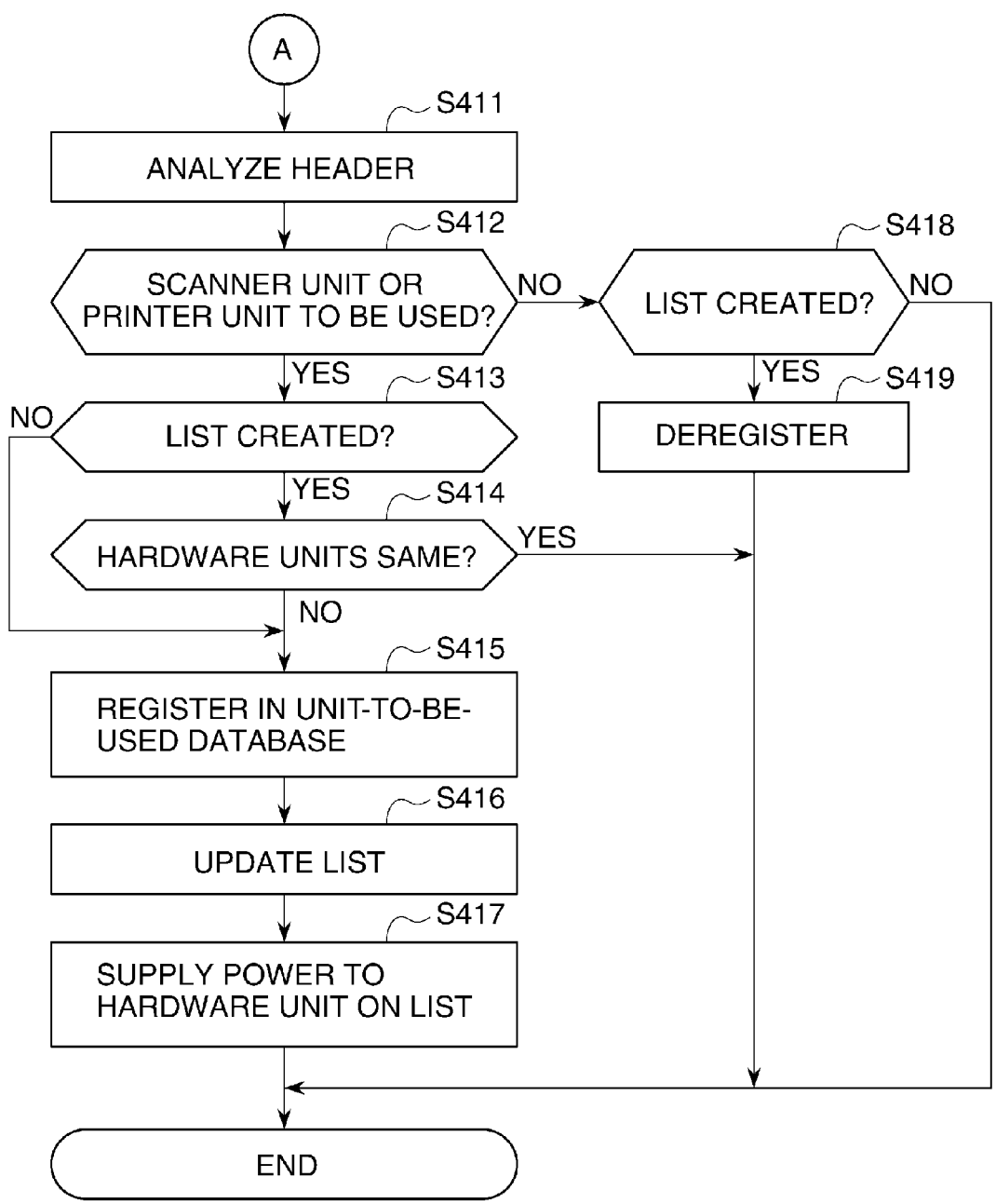

FIGS. 12A and 12B are flowcharts showing the procedure of a power supply control process in the case where the unit-to-be-used database 803 and the HTTP response 901 are used.

The process in FIG. 12A and 12B is carried out by the core unit 200 in FIG. 2 when the user depresses the Web app button 1201 in FIG. 3.

Referring to FIG. 12A, first, the core unit 200 renders HTML of the Web application 104 for the screen control module 300 using the Web browser 301 (step S401). Next, the core unit 200 obtains the application ID 400 of the Web application 104 (step S402).

Then, the core unit 200 obtains the unit-to-be-used information 403 corresponding to the application ID 400 of the Web application 104 from the unit-to-be-used database 803 using the data management module 802 (step S403). Based on the obtained unit-to-be-used information 403, the core unit 200 determines whether or not the Web application 104 uses the scanner unit 204 or the printer unit 205 (step S404).

When the core unit 200 determines in the step S404 that the Web application 104 does not use the scanner unit 204 or the printer unit 205 (NO in the step S404), the process proceeds to step S406. On the other hand, as a result of the determination in the step S404, when the Web application 104 uses the scanner unit 204 or the printer unit 205 (YES in the step S404), the core unit 200 creates a list of hardware units to be used (step S405).

Then, the core unit 200 accesses the Web server 103 using the Web browser 301 (step S406) and sends an HTTP request to the Web server 103 (step S407). Upon receiving the HTTP response 901 from the Web server 103 (step S408), the core unit 200 renders the response body 903 of the received HTTP response 901 for the screen control module 300 (step S409). When the response body 903 is rendered, the core unit 200 supplies power to a hardware unit on the list created in the step S405 using the power status control module 304 (step S410).

Referring to FIG. 12B, the core unit 200 then analyzes the response header 902 of the received HTTP response 901 (step S411). Based on a result of the analysis in the step S411, the core unit 200 determines whether or not information on the scanner unit 204 or the printer unit 205 is described in the response header 902, that is, whether or not the Web application 104 uses the scanner unit 204 or the printer unit 205 (step S412).

As a result of the determination in the step S412, when the Web application 104 does not use the scanner unit 204 or the printer unit 205 (NO in the step S412), the core unit 200 determines whether or not the list was created in the step S405 (step S418).

As a result of the determination in the step S418, when the list was not created (NO in the step S418), the core unit 200 terminates the present process. On the other hand, as a result of the determination in the step S418, when the list was created (YES in the step S418), the core unit 200 deletes a record corresponding to the application ID 400 of the Web application 104, which was obtained in the step S402, from the unit-to-be-used database 803 using the data management module 802 to thus deregister the Web application in the unit-to-be-used database 803 (step S419) and terminates the present process.

Back to the step S412, as a result of the determination in the step S412, when the Web application 104 uses the scanner unit 204 or the printer unit 205 (YES in the step S412), the core unit 200 determines whether or not the list was created in the step S405 (step S413).

When the core unit 200 determines in the step S413 that the list was not created (NO in the step S413), the process proceeds to step S415. On the other hand, as a result of the determination in the step S413, when the list was created (YES in the step S413), the core unit 200 determines whether or not the hardware unit described in HTML is the same as a hardware unit on the list created in the step S405 (step S414).

As a result of the determination in the step S414, when the hardware unit described in HTML is the same as a hardware unit on the list created in the step S405 (YES in the step S414), the core unit 200 terminates the process.

On the other hand, as a result of the determination in the step S414, when the hardware unit described in HTML is not the same as a hardware unit on the list created in the step S405 (NO in the step S414), the core unit 200 registers the hardware unit described in HTML as a hardware unit to be used by the Web application 104 to thus update the unit-to-be-used database 803 (step S415).

Then, the core unit 200 updates the list with the hardware unit described in HTML (step S416). When there is any hardware unit to which no power was supplied in the step S410 among hardware units on the updated list, the core unit 200 then supplies power to this hardware unit (step S417) and terminates the present process.

In the embodiment described above, a hardware unit to be used by the Web application 104 is clearly specified in the HTTP response 901 or the unit-to-be-used database 803, but referring next to FIG. 13, a description will be given of a case where a hardware unit to be used by the Web application 104 is not clearly specified in the HTTP response 901.

Figure 13:
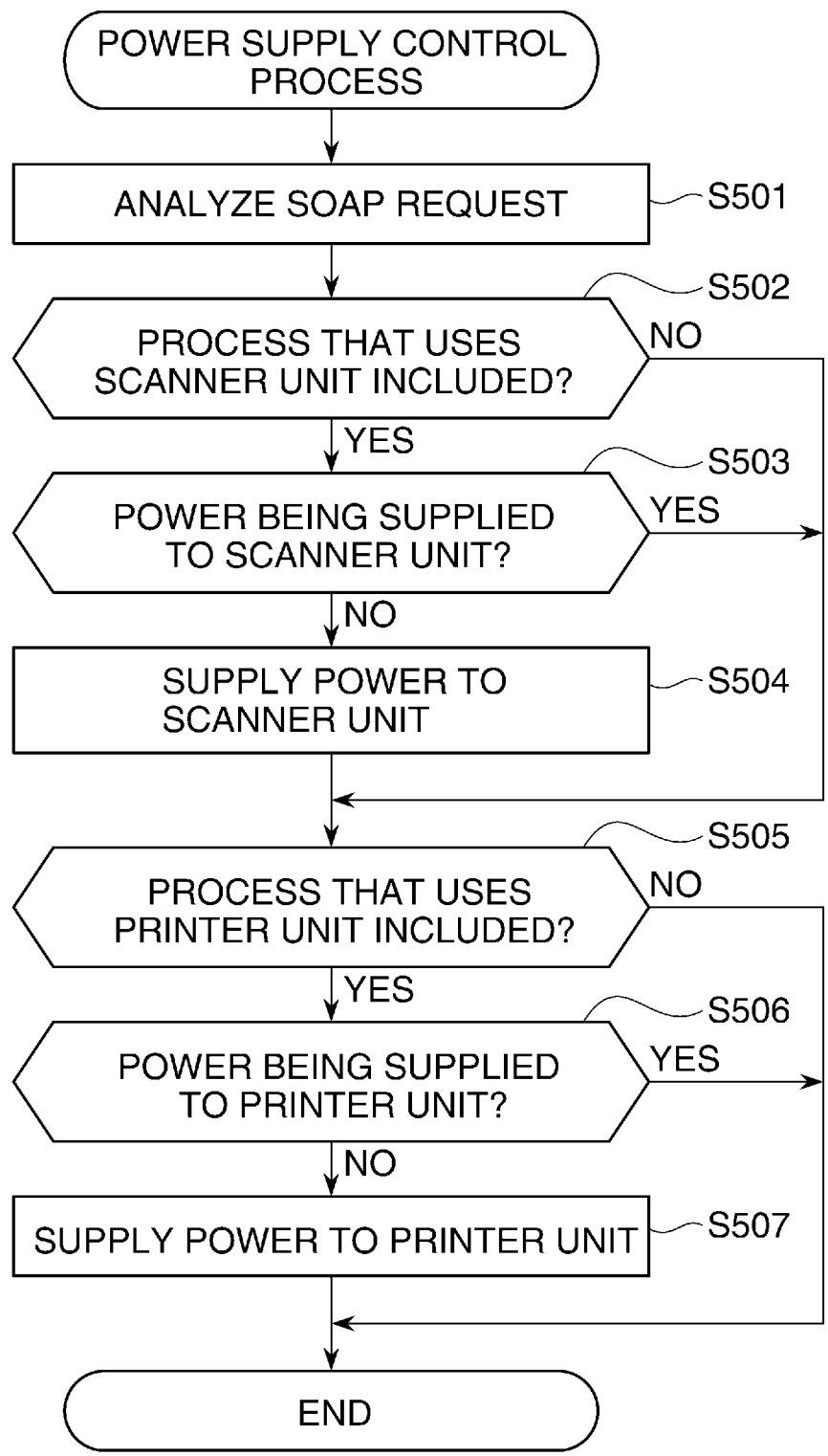
FIG. 13 is a flowchart showing the procedure of a power supply control process that is carried out by the core unit in FIG. 2 in a case where a hardware unit to be used is not clearly specified in the HTTP response.

FIG. 13 is a flowchart showing the procedure of a power supply control process that is carried out by the core unit 200 in a case where a hardware unit to be used is not clearly specified in the HTTP response 901.

It is assumed that in the process in FIG. 13, not a hardware unit to be used but a process to be carried out is clearly specified in a SOAP request for use in requesting a job using the scanner unit 204 or the printer unit 205.

First, the core unit 200 analyzes the SOAP request received from the Web server 103 when executing the Web application 104 (step S501), and as a result of the analysis, determines whether or not a process using the scanner unit 204 is included in the SOAP request (step S502).

When the core unit 200 determines in the step S502 that a process using the scanner unit 204 is not included in the SOAP request (NO in the step S502), the process proceeds to step S505. On the other hand, as a result of the determination in the step S502, when a process using the scanner unit 204 is included in the SOAP request (YES in the step S502), the core unit 200 determines whether or not power is being supplied to the scanner unit 204 (step S503).

When the core unit 200 determines in the step S503 that power is being supplied to the scanner unit 204 (YES in the step S503), the process proceeds to the step S505. On the other hand, as a result of the determination in the step S503, when power is not being supplied to the scanner unit 204 (NO in the step S503), the core unit 200 supplies power to the scanner unit 204 using the power status control module 304 (step S504).

Then, the core unit 200 determines whether or not a process using the printer unit 205 is included in the received SOAP request (step S505).

When the core unit 200 determines in the step S505 that a process using the printer unit 205 is not included in the SOAP request (NO in the step S505), the core unit 200 terminates the present process. On the other hand, as a result of the determination in the step S505, when a process using the printer unit 205 is included in the SOAP request (YES in the step S505), the core unit 200 determines whether or not power is being supplied to the printer unit 205 (step S506).

As a result of the determination in the step S506, when power is being supplied to the printer unit 205 (YES in the step S506), the core unit 200 terminates the present process. On the other hand, as a result of the determination in the step S506, when power is not being supplied to the printer unit 205 (NO in the step S506), the core unit 200 supplies power to the printer unit 205 using the power status control module 304 (step S507) and terminates the present process.

As described above, according to the present embodiment, when the Web application 104 is to be executed, specific information for identifying a hardware unit to be used by the Web application 104 is obtained from the Web server 103, and power is supplied to a hardware unit identified by the obtained specific information.

As a result, when a job that may use a hardware unit is input, power is supplied to this hardware unit in advance, and hence image processing is performed without delay when the Web application 104 is executed.

Moreover, since power is supplied to a hardware unit after a possibility that this hardware unit will be used arises, the amount of power consumed by the image forming apparatus can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-243753, filed Nov. 26, 2013, which is hereby incorporated by reference herein in its entirety.

What is claimed is:

1. An image forming apparatus that communicates with a Web server, comprising:
   a reading unit configured to read an image;
   a printing unit configured to print the image;
   a power supply unit configured to supply power to at least one of the reading unit and the printing unit;
   a core unit configured to send a request for data to the Web server and to receive the data from the Web server, the data including a response header and a web application to be displayed, wherein the response header specifies whether the web application uses the reading unit or the printing unit;
   an operating unit configured to display an operating screen based on the data received from the Web server; and
   a control unit configured to, based on whether the response header specifies that the web application uses the reading unit or the printing unit, provide control as to whether or not to cause the power supply unit to supply power to the reading unit or the printing unit, respectively.

2. The image forming apparatus according to claim 1, wherein the data is HTML data.

3. The image forming apparatus according to claim 1, wherein the data is a Java script.

4. The image forming apparatus according to claim 1, wherein specific information included in the data, which specifies whether the web application uses the reading unit or the printing unit, is registered in association with a URL.

5. The image forming apparatus according to claim 1, wherein specific information included in the data, which specifies whether the web application uses the reading unit or the printing unit, is registered in association with identification information that identifies web applications.

6. A control method for an image forming apparatus that communicates with a Web server and has a reading unit that reads an image, a printing unit that prints the image and a core unit that controls the image forming apparatus, comprising:
   a power supply step of supplying power to at least one of the reading unit and the printing unit;
   a transmitting step of sending a request for data to the Web server,
   a receiving step of receiving the data from the Web server, the data including a response header and a web application to be displayed, wherein the response header specifies whether the web application uses the reading unit on the printing unit;
   an operating step of displaying an operating screen based on the data transmitted from the Web server; and
   a control step of, based on whether the response header specifies that the web application uses the reading unit or the printing unit, providing control as to whether or not to supply power to the reading unit or the printing unit, respectively.

7. A non-transitory computer-readable storage medium storing a program for causing a computer of an image forming apparatus, which communicates with a Web server and has a reading unit that reads an image and a printing unit that prints the image, to execute a control method for the image forming apparatus, the control method comprising:

a power supply step of supplying power to at least one of the reading unit and the printing unit;

a transmitting step of sending a request for data to the Web server;

a receiving step of receiving the data from the Web server, the data including a response header and a web application to be displayed, wherein the response header specifies whether the web application uses the reading unit or the printing unit;

an operating step of displaying an operating screen based on the data received from the Web server; and a control step of, based on whether the response header specifies that the web application uses the reading unit or the printing unit, providing control as to whether or not to supply power to the reading unit or the printing unit, respectively.

* * * * *